(12) United States Patent
Suenami et al.

(10) Patent No.: US 8,721,324 B2
(45) Date of Patent: May 13, 2014

(54) INJECTION DEVICE

(75) Inventors: Kensuke Suenami, Toyota (JP);
Tsuyoshi Inoue, Toyota (JP)

(73) Assignee: Kojima Press Industry Co., Ltd. (JP)

( * ) Notice: Subject to any disclaimer, the term of this patent is extended or adjusted under 35 U.S.C. 154(b) by 136 days.

(21) Appl. No.: 13/336,433

(22) Filed: Dec. 23, 2011

(65) Prior Publication Data
US 2012/0161360 A1 Jun. 28, 2012

(30) Foreign Application Priority Data

Dec. 27, 2010 (JP) .................................. 2010-290274

(51) Int. Cl.
*B29C 45/02* (2006.01)

(52) U.S. Cl.
USPC ............................................ 425/587; 366/79

(58) Field of Classification Search
USPC .............. 74/143; 366/76.3, 76.7, 79; 425/587
See application file for complete search history.

(56) References Cited

U.S. PATENT DOCUMENTS

| | | | | |
|---|---|---|---|---|
| 184,598 A * | 11/1876 | Eells | ............................... | 74/143 |
| 1,692,858 A * | 11/1928 | Peiler | ............................... | 65/125 |
| 2,890,491 A * | 6/1959 | Hendry | ..................... | 264/328.14 |
| 3,278,992 A * | 10/1966 | Strauss | .......................... | 425/136 |
| 3,633,494 A * | 1/1972 | Schippers et al. | ............. | 222/408 |
| 3,825,517 A * | 7/1974 | Ficarra | ........................... | 523/521 |
| 3,998,439 A * | 12/1976 | Feix | ........................... | 366/76.91 |
| 5,225,476 A * | 7/1993 | Sperk et al. | .................... | 524/507 |
| 5,756,037 A * | 5/1998 | Kitamura | .................... | 264/328.1 |
| 2010/0089295 A1 * | 4/2010 | Moench | ......................... | 110/346 |

FOREIGN PATENT DOCUMENTS

| JP | 63-172628 A | 7/1988 |
|---|---|---|
| JP | 07-241851 A | 9/1995 |
| JP | 10-329173 A | 12/1998 |
| JP | 2002307485 A | 10/2002 |

OTHER PUBLICATIONS

Notification of Reasons for Rejection dated Mar. 11, 2014 for Japanese Patent Application No. 2010-290274.

* cited by examiner

*Primary Examiner* — Matthew Daniels
(74) *Attorney, Agent, or Firm* — Conley Rose, P.C.

(57) ABSTRACT

An injection device may include an injecting portion, and a material feeding portion having a pelletized resinous material. The material feeding portion includes a cylindrical feeding passage that is communicated with the injecting portion, a screw that is disposed in the feeding passage, and a drive mechanism that is configured to rotate the screw about a rotational axis. When the screw is rotated about the rotational axis by the drive mechanism, the pelletized resinous material can be fed into the injecting portion.

2 Claims, 5 Drawing Sheets

INJECTION DEVICE

BACKGROUND OF THE INVENTION

1. Field of the Invention

The present invention relates to an injection device. More particularly, the present invention relates to an injection device in which a pelletized resinous material is fed into an injecting portion via a material feeding portion and in which the resinous material is melted in the injecting portion and is then injected into a molding die.

2. Description of Related Art

A known injection device is taught, for example, by Japanese Laid-open Patent Publication Number 2002-307485. In this known injection device, a material feeding passage is vertically formed in a material feeding block. The material feeding block has a hopper that is attached to an upper end thereof, and a heating cylinder that is attached to a lower end thereof. The hopper contains a pelletized resinous material therein. The heating cylinder functions as an injecting portion. The pelletized resinous material contained in the hopper can be fed into the heating cylinder by gravity via the material feeding passage. The pelletized resinous material fed into the heating cylinder can be melted in the heating cylinder to form a molten resinous material. The molten resinous material can be injected from the heating cylinder (the injecting portion) into a mold.

Further, the material feeding block has a bridge breaker that is capable of preventing the pelletized resinous material from being bridged. The bridge breaker has a push-in passage that is communicated with an interior of the heating cylinder via a lower end portion of the material feeding passage, and a breaker plunger that is capable of reciprocating within the push-in passage. Due to actuation of the breaker plunger, the pelletized resinous material can be smoothly pushed into the heating cylinder. Thus, the pelletized resinous material can be effectively prevented from being bridged in the material feeding passage.

However, in the known injection device, the pelletized resinous material can be fed into the heating cylinder (the injecting portion) by gravity. Therefore, the pelletized resinous material cannot be completely prevented from being bridged in the material feeding passage. That is, the pelletized resinous material can sometimes be bridged in the material feeding passage to form a bridged resinous material therein. The bridged resinous material thus formed cannot be easily broken even if a force is applied thereto by the breaker plunger. This is because the force applied by the breaker plunger is a single directional force. As a result, the bridged resinous material cannot substantially be pushed into the heating cylinder by the breaker plunger. This may lead to clogging of the material feeding passage caused by the bridged resinous material.

In addition, the pelletized resinous material can be fed into the heating cylinder (the injecting portion) by gravity. That is, the pelletized resinous material can be transferred downwardly (i.e., in a direction of gravitational force) toward the heating cylinder. Therefore, the injection device can be restricted from a standpoint of design. For example, the injection device must be designed such that the heating cylinder can be transversely or horizontally positioned. If the heating cylinder is vertically or obliquely positioned, the pelletized resinous material cannot be stably and reliably fed into the heating cylinder. As a result, the molten resinous material formed in the heating cylinder cannot be sufficiently and uniformly injected from the heating cylinder into the mold. This may lead to considerable variation in quality of a molded article formed in the mold.

Thus, there is a need in the art for an improved injection device.

SUMMARY OF THE INVENTION

In one embodiment of the present invention, an injection device may include an injecting portion, and a material feeding portion having a pelletized resinous material. The material feeding portion includes a cylindrical feeding passage that is communicated with the injecting portion, a screw that is disposed in the feeding passage, and a drive mechanism that is configured to rotate the screw about a rotational axis. When the screw is rotated about the rotational axis by the drive mechanism, the pelletized resinous material can be fed into the injecting portion.

According to the present invention, the pelletized resinous material contained in the feeding passage can be fed into the injecting portion by the screw. That is, the pelletized resinous material can be extruded into the injecting portion. Therefore, the pelletized resinous material can be smoothly fed into the injecting portion, so as to be effectively prevented from being bridged in the feeding passage.

Further, even when the pelletized resinous material is bridged to form a bridged resinous material in the feeding passage, the bridged resinous material may be applied with multidirectional force by the screw. As a result, the bridged resinous material can be easily broken by the screw, so that the feeding passage can be effectively prevented from being clogged by the bridged resinous material. Thus, the pelletized resinous material can be reliably fed into the injecting portion.

Optionally, the drive mechanism of the material feeding portion may include a drive cylinder having an actuating rod, a pair of links respectively connecting the actuating rod and the screw, and one-way clutches that are respectively positioned between the links and the screw. The one-way clutches may respectively be arranged and constructed to rotate the screw in a predetermined direction when the actuating rod of the drive cylinder reciprocates.

Other objects, features and advantages of the present invention will be readily understood after reading the following detailed description together with the accompanying drawings and the claims.

DETAILED DESCRIPTION OF THE INVENTION

A detailed representative embodiment of the present invention will be described with reference FIGS. 1 to 5.

Further, an injection device 1 in the following description is an injection device that is used in a direct molding process in which a secondary resin molded article is directly molded on a portion of a primary resin molded article that is previously molded using a primary mold. Generally, in the direct molding process, a secondary mold is positioned on the primary resin molded article to form a molding cavity on the primary resin molded article. Thereafter, a resinous material is injected into the molding cavity, so that the secondary resin molded article can be directly molded on the primary resin molded article. Thus, a final resin molded article composed of the primary resin molded article and the secondary resin molded article can be produced. According to the direct molding process, the secondary resin molded article can be formed in the primary resin molded article without changing the primary mold. In addition, no connecting device is required to connect the secondary resin molded article to the primary resin molded article. Therefore, it is possible to form the final resin molded article without increasing manufacturing costs.

Generally, the resinous material of the secondary resin molded article may preferably be polypropylene (PP) that can be melted at around 220 degrees C. Further, recycled polypropylene can be used as the resinous material of the secondary resin molded article.

Figure 1:
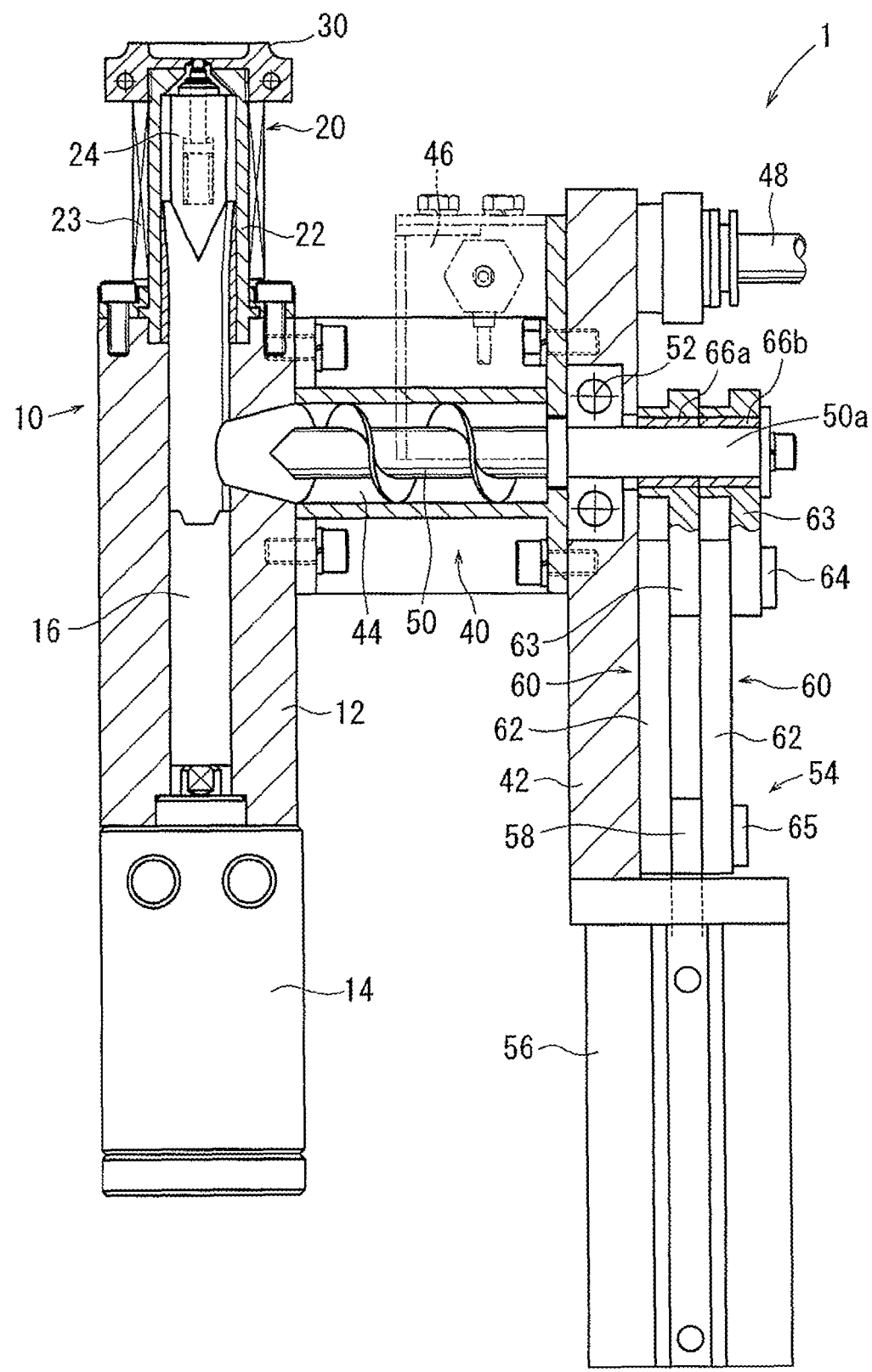
FIG. 1 is an elevational view of an injection device according to a representative embodiment of the present invention.

As shown in FIG. 1, the injection device 1 may preferably be composed of an injecting portion 10 and a material feeding portion 40 capable of feeding a pelletized resinous material toward the injecting portion 10. The injecting portion 10 is capable of melting the pelletized resinous material to form a molten resinous material therein and injecting the molten resinous material therefrom. The injecting portion 10 may include a cylindrical main body 12 having an axial through bore, an injection cylinder 14 attached to one (lower) end portion of the main body 12, and a cylindrical nozzle body 20 attached to the other (upper) end portion of the main body 12 and having a through bore. The injection cylinder 14 may preferably be an air cylinder. The nozzle body 20 may preferably be positioned axially aligned with the main body 12 and may preferably be internally communicated therewith. The injection cylinder 14 may preferably have a plunger 16 that is arranged and constructed to move or reciprocate between the through bore of the main body 12 and the through bore of the nozzle body 20 when the injection cylinder 14 is actuated.

Figure 2:
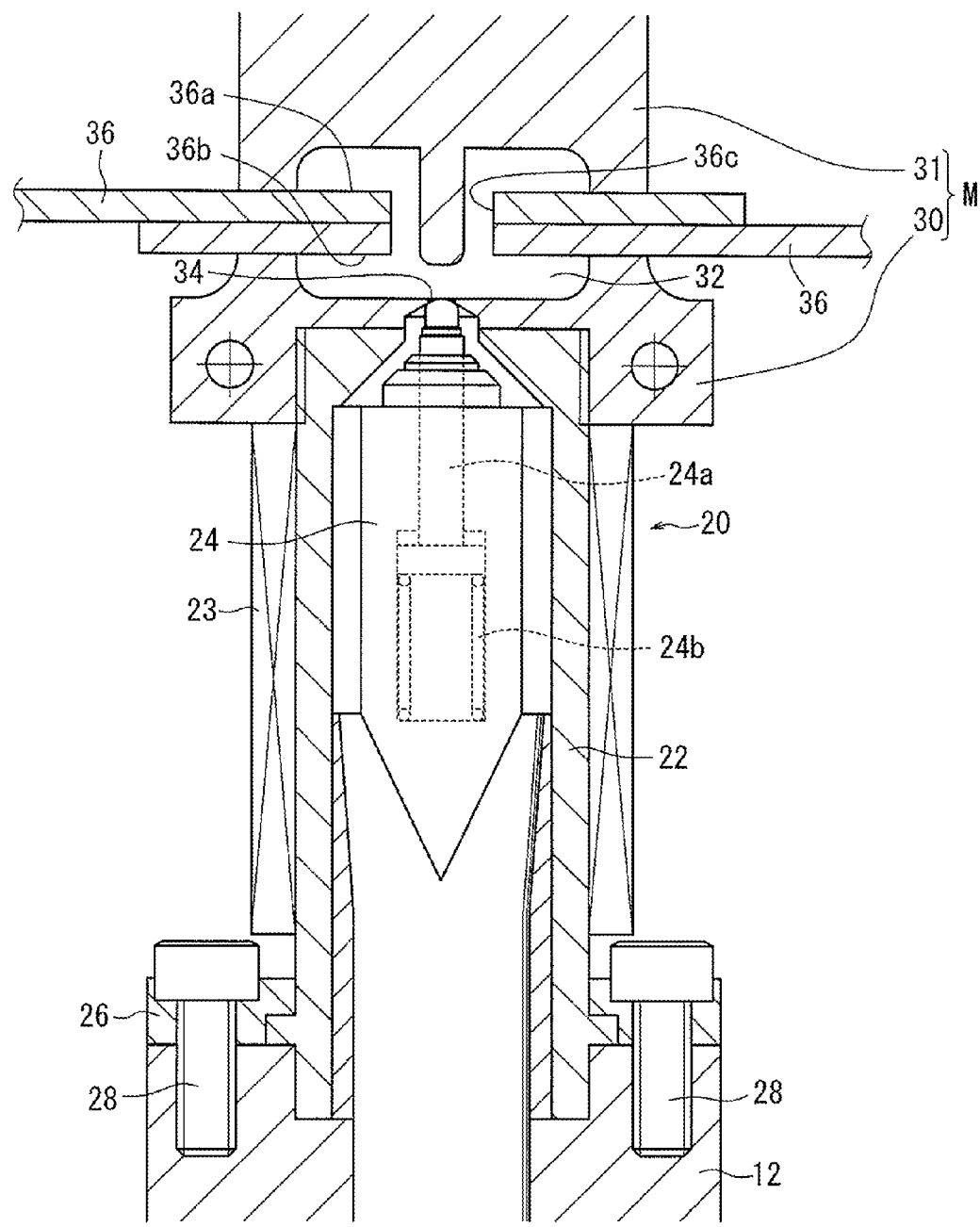
FIG. 2 is a partially enlarged view of FIG. 1, which view illustrates a nozzle of an injecting portion.

As shown in FIG. 2, the nozzle body 20 may preferably have a cylindrical nozzle holder 22 and a torpedo 24 received in the nozzle holder 22. A proximal end portion of the nozzle holder 22 is connected to the upper end portion of the main body 12 via a retainer 26 and a plurality of bolts 28 (FIG. 2). Conversely, a distal end portion of the nozzle holder 22 is screwed on a first (lower) die 30 of a mold M that is used to form a secondary molded article (not shown) in a primary molded article 36. Further, the nozzle body 20 may preferably have an electrothermal-type heater 23 that is circumferentially positioned around the nozzle holder 22. Further, a cooling device (not shown) is attached to the main body 12, so as to prevent the main body 12 from being excessively heated by the heater 23.

As shown in FIG. 2, a second (upper) die 31 of the mold M may be secured to the first die 30 with interleaving a portion of the primary molded article 36. Thus, a molding cavity 32 capable of forming the secondary resin molded article may be formed on the primary molded article 36.

As shown in FIG. 2, the first die 30 has a gate 34 through which an interior of the nozzle holder 22 is communicated with the molding cavity 32. The gate 34 is normally closed by a tip surface of a piston 24a that is retractably attached to the torpedo 24. The piston 24a is constantly biased upwardly by a spring 24b. Further, the piston 24a is arranged and constructed to be retracted into the torpedo 24 against a spring force of the spring 24b when a pressure (resin pressure) applied between the gate 34 and the tip surface of the piston 24a (i.e., an end surface of the torpedo 24) is increased, so that the gate 34 can be opened.

As shown in FIG. 2, the primary resin molded article 36 may be composed of two laminated plate-shaped members in which a through bore 36c is formed. In this embodiment, the molding cavity 32 may substantially be defined by inner surfaces of the first and second dies 30 and 31 of the mold M, upper and lower surfaces 36a and 36b of the primary molded article 36, and a circumferential surface of the through bore 36c formed in the primary molded article 36. Therefore, the secondary resin molded article formed by the molding cavity 32 may be formed as a connecting member that is capable of connecting the primary resin molded article 36, i.e., the laminated plate-shaped members.

As shown in FIG. 1, the material feeding portion 40 may preferably include a cylindrical feeding passage 44 that is positioned horizontally, i.e., perpendicular to an axial direction of the injecting portion 10. The feeding passage 44 is communicated with the main body 12 of the injecting portion 10. The feeding passage 44 is arranged and constructed such that the pelletized resinous material can be fed thereinto via a hopper 46. Further, the pelletized resinous material may preferably be pneumatically fed into the hopper 46 through a feeding pipe 48.

As shown in FIG. 1, a screw 50 may preferably be coaxially disposed in the feeding passage 44. The screw 50 may preferably be supported on a base plate 42 of the material feeding portion 40 via a bearing 52. Further, a proximal end portion of the screw 50 may preferably be projected outwardly through the base plate 42 to form an extended portion 50a.

As shown in FIG. 1, the material feeding portion 40 may preferably include a drive mechanism 54. The drive mechanism 54 may have a drive cylinder 56 that is positioned below the base plate 42. The drive cylinder 56 may preferably be an air cylinder. The drive cylinder 56 may have an actuating rod 57 (FIG. 3) that is arranged and constructed to move or reciprocate vertically, i.e., in a direction perpendicular to an axial direction of the screw 50.

Figure 3:
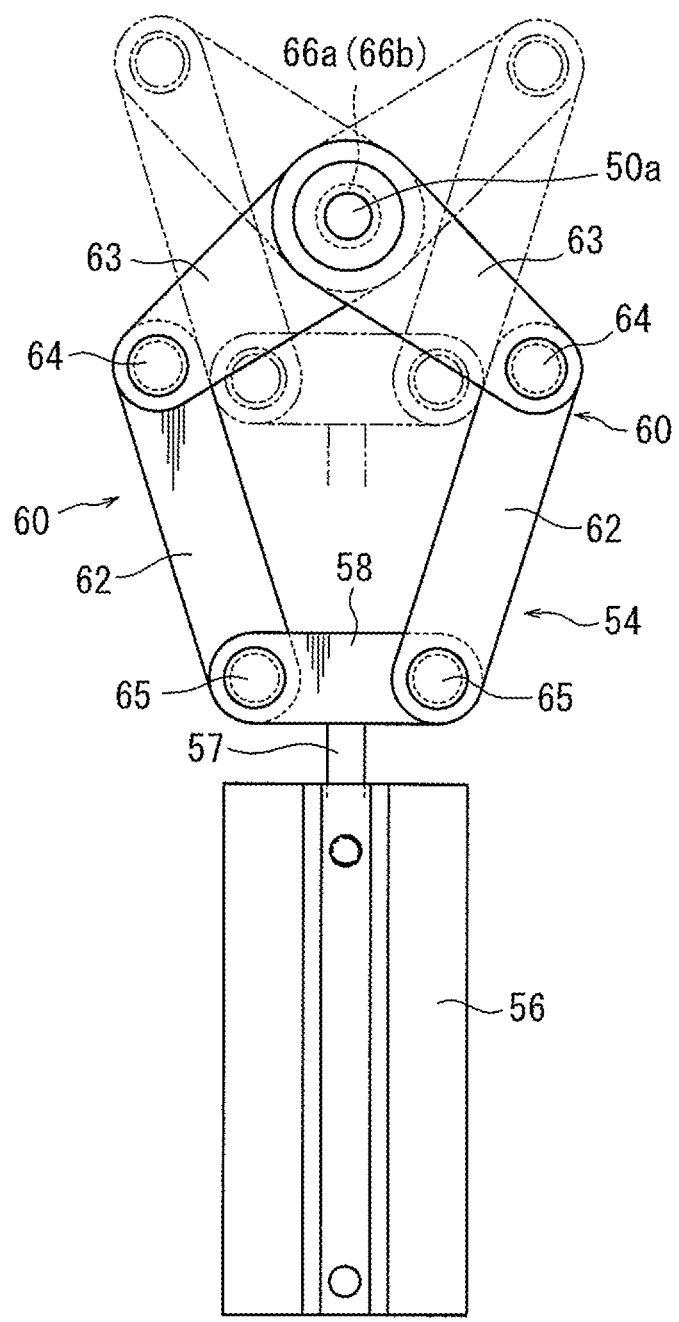
FIG. 3 is a side view of a drive mechanism of a material feeding portion.
Figure 4:
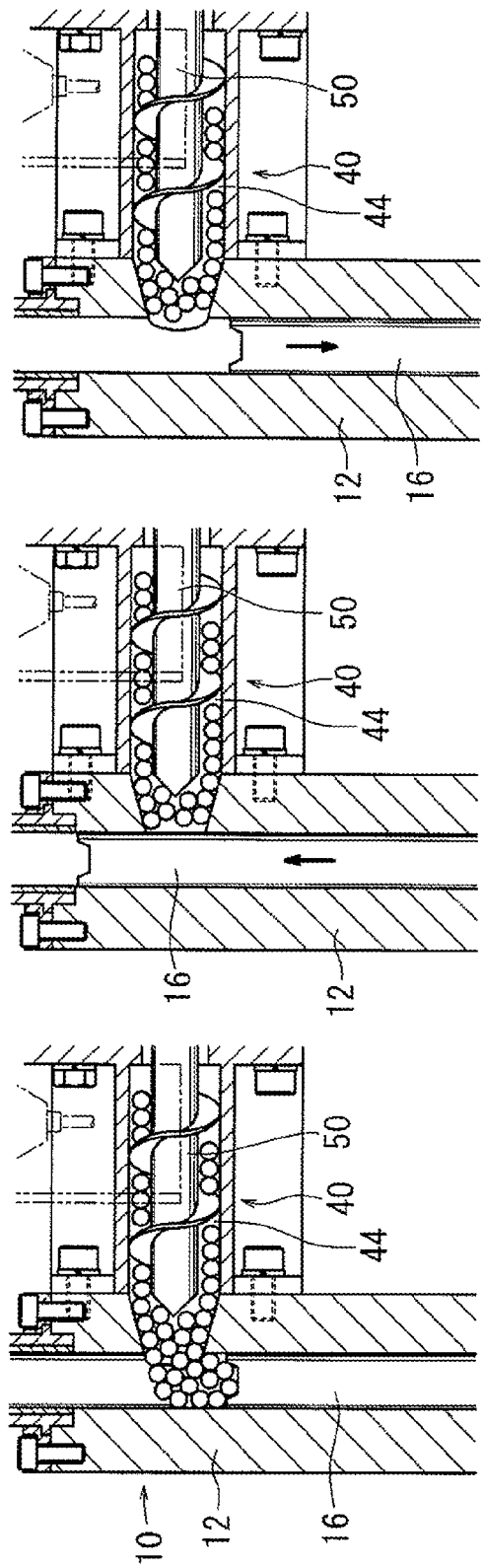
FIG. 4(A) is an explanatory view, illustrating a condition in which a plunger is refracted and a resinous material in the material feeding portion is extruded into a body of the injecting portion.
FIG. 4(B) is an explanatory view, illustrating a condition in which the plunger is projected and the extruded resinous material is fed into the nozzle.
FIG. 4(C) is an explanatory view, illustrating a condition in which the plunger is refracted again and the resinous material in the material feeding portion is not extruded into the body of the injecting portion.

As shown in FIG. 3, the actuating rod 57 of the drive cylinder 56 may be connected to the extended portion 50a of the proximal end portion of the screw 50 via a pair of links 60 (i.e., a double link mechanism). In particular, each of the links 60 may be constructed of a first link member 62 and a second link member 63 that are pivotally connected to each other via a pin 64. The first link members 62 of the links 60 may respectively be connected to both ends of a connecting member 58 via pins 65. Further, the connecting member 58 is attached to the actuating rod 57. Conversely, the second link members 63 of the links 60 may respectively be connected to the extended portion 50a of the proximal end portion of the screw 50 via one-way clutches 66a and 66b (FIG. 1). Further, the one-way clutches 66a and 66b may respectively have torque transmitting directions that are different from each other. In other words, the one-way clutches 66a and 66b may respectively configured to rotate the screw 50 in one direction (in a predetermined direction).

Due to reciprocating motion of the actuating rod 57 of the drive cylinder 56, the links 60 move between a condition shown by solid line in FIG. 3 (i.e., an expanded condition) and a condition shown by broken line in FIG. 3 (i.e., a contracted condition). As will be appreciated, one of the links 60 may rotate the screw 50 in the predetermined direction via the one-way clutch 66a when the links 60 move from the expanded condition toward the contracted condition (i.e., when the actuating rod 57 moves in an advancing direction). To the contrary, the other of the links 60 may rotate the screw 50 in the predetermined direction via the one-way clutch 66b when the links 60 move from the contracted condition toward the expanded condition (i.e., when the actuating rod 57 moves in a retracting direction). Thus, upon reciprocation of the actuating rod 57 of the drive cylinder 56, the screw 50 can be continuously rotated in the predetermined direction about a rotational axis via the links 60.

Upon rotation of the screw 50, the pelletized resinous material fed into the feeding passage 44 via the hopper 46 may be extruded into the main body 12 of the injecting portion 10. The pelletized resinous material fed into the main body 12 may be conveyed into the nozzle holder 22 of the nozzle body 20 by reciprocating motion of the plunger 16 due to actuation of the injection cylinder 14. The pelletized resinous material introduced into the nozzle holder 22 may be heated by the heat from the heater 23 that is attached to the nozzle holder 22. The heated pelletized resinous material in the nozzle holder 22 may be melted around the torpedo 24 to form the molten resinous material therein. The molten resinous material may be injected into the molding cavity 32 of the mold M through the gate 34 of the first die 30 to form the secondary resin molded article.

In particular, in a feeding stage shown in FIG. 4(A), the pelletized resinous material contained in the feeding passage 44 may be continuously fed into the main body 12 of the injecting portion 10 by the screw 50. In an injection stage shown in FIG. 4(B), the pelletized resinous material fed into the main body 12 may be conveyed into the nozzle holder 22 of the nozzle body 20 by projecting motion of the plunger 16 due to actuation of the injection cylinder 14. As previously described, the pelletized resinous material introduced into the nozzle holder 22 may be heated and melted by the heater 23 to form the molten resinous material. The molten resinous material thus formed may then be injected into the molding cavity 32 of the mold M through the gate 34 of the first die 30. Further, in a post-injection stage shown in FIG. 4(C), the main body 12 may be temporarily emptied by retracting motion of the plunger 16 due to actuation of the injection cylinder 14.

Therefore, in a subsequent feeding stage, the pelletized resinous material contained in the feeding passage 44 may be smoothly fed into the main body 12 of the injecting portion 10 by the screw 50. Thus, the pelletized resinous material can be effectively prevented from being bridged around a connecting portion of the main body 12 and the feeding passage 44. In other words, a bridging phenomenon of the pelletized resinous material cannot substantially be occurred around the connecting portion of the main body 12 and the feeding passage 44. As a result, the feeding passage 44 can be effectively prevented from being clogged by bridging of the pelletized resinous material.

Generally, in order to change color of the secondary resin molded article, it is necessary to replace the pelletized resinous material with another pelletized resinous material. In this case, the pelletized resinous material can be easily replaced with another pelletized resinous material by simply replacing the pelletized resinous material in the feeding passage 44 with another pelletized resinous material in the post-injection stage shown in FIG. 4(C). As previously described, in the post-injection stage, the main body 12 may be temporarily emptied. As a result, an additional process is not necessary in order to eject the pelletized resinous material contained in the main body 12.

As described above, the pelletized resinous material contained in the feeding passage 44 can be extruded into the main body 12 of the injecting portion 10 by the screw 50. Therefore, even when the pelletized resinous material may be bridged to form a bridged resinous material in the feeding passage 44, the bridged resinous material may be applied with multidirectional force by the screw 50. As a result, the bridged resinous material thus formed can be easily broken by the screw 50, so that the feeding passage 44 can be effectively prevented from being clogged by the bridged resinous material.

Further, the screw 50 may simply rotate about the rotational axis thereof without moving axially. That is, the screw 50 is structurally different from a reciprocating breaker plunger (not shown) of a bridge breaker that is used in a conventional injection device. Therefore, the screw 50 can be disposed within the feeding passage 44 such that a distal end thereof can be positioned closely adjacent to the through bore of the cylindrical main body 12, i.e., such that the distal end thereof can be positioned closely adjacent to the plunger 16 reciprocating within the through bore of the main body 12. Therefore, it is possible to reduce an amount of the pelletized resinous material that can remain in the connecting portion of the main body 12 and the feeding passage 44.

Figure 5:
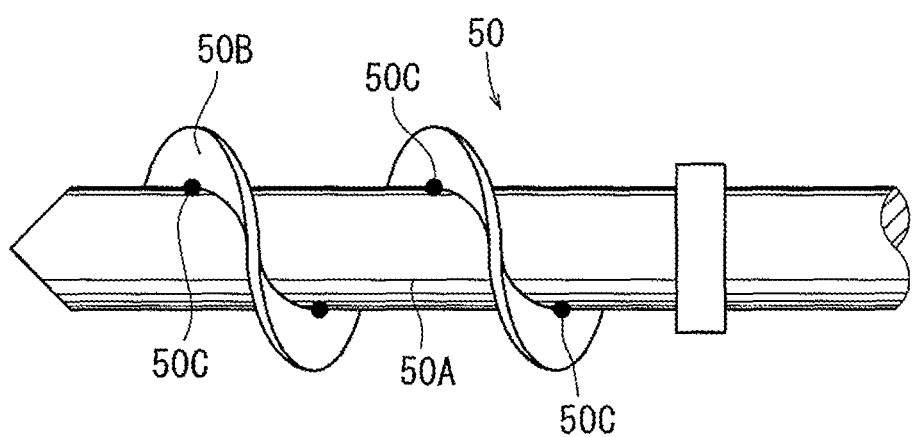
FIG. 5 is an enlarged side view of a screw of the material feeding portion.

Further, as shown in FIG. 5, the screw 50 may be constructed of a rod 50A and a helical coil plate 50B. The helical coil plate 50B may be circumferentially attached to the rod 50A and may be spot-welded at a plurality of welding points 50C. Therefore, the screw 50 may be manufactured at low costs relative to a generally available screw that is integrally formed. This may reduce manufacturing costs of the injection device 1.

Further, according to the present embodiment, due to a combination of the double link mechanism and the one-way clutches 66a and 66b, the screw 50 may have an increased rotation amount (angle) per one stroke of the actuating rod 57. That is, the screw 50 may be effectively rotated by the actuating rod 57. In addition, the screw 50 may be smoothly rotated by the actuating rod 57. As a result, the pelletized resinous material contained in the feeding passage 44 can be effectively and quickly fed into the main body 12 of the injecting portion 10 by the screw 50.

As described above, the pelletized resinous material contained in the feeding passage 44 may be extruded into the main body 12 of the injecting portion 10 by the screw 50. Therefore, the injection device 1 can be designed such that the molten resinous material can be injected in various directions. That is, the injection device 1 can be designed such that the injecting portion 10 can be obliquely or vertically positioned. Thus, the injection device 1 can have an increased flexibility in design. This may result in reduction in size of the injection device 1.

Various changes and modifications may be made to the representative embodiment without departing from the scope of the present invention. For example, in this embodiment, the double link mechanism (the links 60) is used. However, the double link mechanism can be replaced with a single link mechanism as necessary.

Further, in this embodiment, the drive mechanism 54 includes the drive cylinder 56 and the links 60. However, the drive cylinder 56 and the links 60 can be replaced with a motor and a transmission mechanism as necessary. Further, the motor may be a torque motor, a servomotor or other such motors. Conversely, the transmission mechanism may be a gear transmission, a chain transmission or other such transmissions.

Further, the piston 24a received in the torpedo 24 of the nozzle body 20 can be omitted as necessary, so that the gate 34 of the first die 30 can be constantly opened.

Further, in this embodiment, the secondary resin molded article may be formed as the connecting member that is capable of connecting the laminated plate-shaped members (the primary resin molded articles 36). However, the secondary resin molded article may be formed as a rib, a projection or a wall that is simply formed on a surface of the primary resin molded articles 36. In such a case, the mold M can be constructed of a single die.

A representative example of the present invention has been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. An injection device, comprising:
   an injecting portion; and
   a material feeding portion configured to contain a pelletized resinous material,
   wherein the material feeding portion includes a cylindrical feeding passage that is communicated with the injecting portion, a screw that is disposed in the feeding passage, and a drive mechanism that is configured to rotate the screw about a rotational axis;
   wherein when the screw is rotated about the rotational axis by the drive mechanism, the pelletized resinous material is fed into the injecting portion;
   wherein the drive mechanism of the material feeding portion includes a drive cylinder having an actuating rod, a pair of links respectively connecting the actuating rod and the screw, and one-way clutches that are respectively positioned between the links and the screw; and
   wherein the one-way clutches are respectively arranged and constructed to rotate the screw in a predetermined direction when the actuating rod of the drive cylinder reciprocates.

2. The injection device as defined in claim 1, wherein one of the one-way clutches is arranged and constructed to rotate the screw in the predetermined direction when the actuating rod moves in an advancing direction, and wherein the other of the one-way clutches is arranged and constructed to rotate the screw in the predetermined direction when the actuating rod moves in a retracting direction.

* * * * *